(12) United States Patent
Park et al.

(10) Patent No.: US 10,498,407 B2
(45) Date of Patent: Dec. 3, 2019

(54) METHOD FOR TRANSMITTING AND RECEIVING CODEBOOK BASED SIGNAL IN MULTI-ANTENNA WIRELESS COMMUNICATION SYSTEM AND APPARATUS THEREFOR

(71) Applicants: LG ELECTRONICS INC., Seoul (KR); SOGANG UNIVERSITY RESEARCH FOUNDATION, Seoul (KR)

(72) Inventors: Jonghyun Park, Seoul (KR); Junyeub Suh, Seoul (KR); Junsik Shin, Seoul (KR); Wonjin Sung, Seoul (KR); Kijun Kim, Seoul (KR)

(73) Assignees: LG Electronics Inc., Seoul (KR); Sogang University Research Foundation, Seoul (KR)

( * ) Notice: Subject to any disclaimer, the term of this patent is extended or adjusted under 35 U.S.C. 154(b) by 0 days.

(21) Appl. No.: 16/067,508

(22) PCT Filed: Dec. 29, 2016

(86) PCT No.: PCT/KR2016/015476
§ 371 (c)(1),
(2) Date: Jun. 29, 2018

(87) PCT Pub. No.: WO2017/166163
PCT Pub. Date: Jul. 6, 2017

(65) Prior Publication Data
US 2019/0036573 A1 Jan. 31, 2019

Related U.S. Application Data

(60) Provisional application No. 62/273,414, filed on Dec. 30, 2015.

(51) Int. Cl.
*H04B 7/0417* (2017.01)
*H04B 7/0456* (2017.01)
*H04B 7/06* (2006.01)

(52) U.S. Cl.
CPC ......... *H04B 7/0417* (2013.01); *H04B 7/0456* (2013.01); *H04B 7/0469* (2013.01);
(Continued)

(58) Field of Classification Search
CPC .. H04B 7/0469; H04B 7/0456; H04B 7/0639; H04B 7/0634; H04B 7/0478;
(Continued)

(56) References Cited

U.S. PATENT DOCUMENTS

2012/0039251 A1 2/2012 Sayana et al.
2013/0107915 A1 5/2013 Benjebbour et al.
(Continued)

FOREIGN PATENT DOCUMENTS

EP 2665203 A1 11/2013
WO 2015/060681 A1 4/2015

*Primary Examiner* — Marsha D Banks Harold
*Assistant Examiner* — Elton Williams
(74) *Attorney, Agent, or Firm* — Dentons US LLP

(57) ABSTRACT

A method for transmitting and receiving signals based on a codebook in a multi-antenna wireless communication system, the method comprising: transmitting a channel state information reference signal (CSI-RS); and reporting channel state information to the base station; Wherein the channel state information includes a Precoding Matrix Indicator (PMI) for indicating a specific code vector among a plurality of code vectors included in the codebook, the codebook being included in each code vector And a phase difference between adjacent elements may be set to be different from each other.

14 Claims, 18 Drawing Sheets

(52) U.S. Cl.
CPC ......... *H04B 7/0482* (2013.01); *H04B 7/0639* (2013.01); *H04B 7/0697* (2013.01)

(58) Field of Classification Search
CPC ...... H04B 7/0482; H04B 7/0473; H01Q 3/30; G01S 3/46; G05D 1/0022; G05D 1/0033; G05D 1/102
See application file for complete search history.

(56) References Cited

U.S. PATENT DOCUMENTS

| | | | | |
|---|---|---|---|---|
| 2013/0336152 | A1* | 12/2013 | Zhu | H04B 15/00 370/252 |
| 2014/0226702 | A1 | 8/2014 | Onggosanusi et al. | |
| 2015/0030006 | A1* | 1/2015 | Fujio | H04B 7/0456 370/336 |
| 2016/0323025 | A1* | 11/2016 | Liu | H04B 7/0478 |

* cited by examiner (a)

(b)

(a) total cell average (b) azimuth angle: 0°

(c) azimuth angle: 15°

(d) azimuth angle: 30°

(e) azimuth angle: 45°

(f) azimuth angle: 60°

(a) parameter $\alpha$ (b) parameter $\beta$ (c) parameter $\chi$ (a) parameter $\alpha_n$ (b) parameter $\beta_n$

METHOD FOR TRANSMITTING AND RECEIVING CODEBOOK BASED SIGNAL IN MULTI-ANTENNA WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2016/015476, filed on Dec. 29, 2016, which claims the benefit of U.S. Provisional Application No. 62/273,414, filed on Dec. 30, 2015, the contents of which are all hereby incorporated by reference herein in their entirety.

TECHNICAL FIELD

The present invention relates to a wireless communication system, and more particularly, to a codebook-based signal transmission/reception method designed to support various antenna array structures and an apparatus therefor.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

In a mobile communication system, studies on codebooks are also being conducted in accordance with the number and structure of antennas and the channel environment. The existing codebook is specialized for a uniform linear antenna array, and cannot reflect a situation in which the antenna array is changed according to structures installed with antennas due to the characteristics of a small cell. Accordingly, in this specification, there is a need to propose a new codebook for the non-linear antenna array/environment (e.g., cylindrical antenna array/environment), which is an antenna array that may be useful in small cell transmission situations.

The technical objects to be achieved by the present disclosure are not limited to the above-mentioned technical objects, and other technical objects which are not mentioned can be clearly understood by those skilled in the art from the following descriptions.

Technical Solution

In an aspect, provided is a method for transmitting/receiving, by a UE, a signal based on a codebook in a multi-antenna wireless communication system, the method including: receiving a Channel State Information Reference Signal (CSI-RS) from a base station through a multi-antenna port; and reporting channel state information to the base station, wherein the channel state information includes a Precoding Matrix Indicator (PMI) for indicating a specific code vector among a plurality of code vectors included in a codebook, and the codebook is a codebook in which phase differences between adjacent elements included in each code vector are set to be different from each other.

The phase difference is set to be different from each other based on a phase parameter related to a phase of each code vector, a phase difference parameter related to a phase difference between adjacent code vectors and/or a phase difference compensation parameter according to an antenna layout.

The phase parameter and the phase difference parameter are determined to be fixed values based on an azimuth angle of the UE with respect to the base station, and the phase difference compensation parameter is determined based on the azimuth angle of the UE, and is dynamically determined according to an element order included in each code vector.

The phase difference increases as the phase difference parameter value increases by an integer multiple as the order of element increases.

Information on the phase parameter, the phase difference parameter, and the phase difference compensation parameter are received from the base station through a control channel.

The method further includes: determining the phase parameter, the phase difference parameter and the phase difference compensation parameter based on the CSI-RS; and transmitting the determined phase parameter, phase difference parameter and phase difference compensation parameter to the base station.

The codebook is defined by Equation (1):

$$\frac{1}{\sqrt{N}} \begin{bmatrix} 1 & 1 & \cdots & 1 \\ e^{j\alpha} & e^{j(\alpha+\beta)} & \cdots & e^{j(\alpha+(M-1)\beta)} \\ e^{j(2\alpha+\chi)} & e^{j(2(\alpha+\beta)+\chi)} & \cdots & e^{j(2(\alpha+(M-1)\beta)+\chi)} \\ \vdots & \vdots & \ddots & \vdots \\ e^{j((N-1)\alpha+F_{N-1}\chi)} & e^{j((N-1)(\alpha+\beta)+F_{N-1}\chi)} & \cdots & e^{j((N-1)(\alpha+(M-1)\beta)+F_{N-1}\chi)} \end{bmatrix} \quad (1)$$

where N is the number of elements in each code vector, M is the number of code vectors, $F\_n$ is $F_n = \Sigma_{k=1}^{n-1} k$, n is the element order in each code vector, $\alpha$ is the phase parameter, $\beta$ is the phase difference parameter, and $\chi$ is the phase difference compensation parameter.

When the phase parameter related to the phase of the code vector is independently determined for each element in the code vector, the phase difference is set to be different from each other based on the phase parameter.

When the phase difference parameter related to the phase difference between adjacent code vectors is independently determined for each element in the code vector, the phase difference is set to be different from each other based on the phase parameter and the phase difference parameter.

Information on the phase parameter and/or the phase difference parameter is received from the base station through a control channel.

The method further includes: determining the phase parameter and/or the phase difference parameter based on the CSI-RS; and transmitting the determined phase parameter and/or phase difference parameter to the base station.

The codebook is defined by Equation (2):

$$W = \frac{1}{\sqrt{N}} \begin{bmatrix} 1 & 1 & \cdots & 1 \\ e^{j\alpha_1} & e^{j(\alpha_1+\beta_1)} & \cdots & e^{j(\alpha_1+(M-1)\beta_1)} \\ e^{j(\alpha_1+\alpha_2)} & e^{j(\alpha_1+\alpha_2+\beta_1+\beta_2)} & \cdots & e^{j(\alpha_1+\alpha_2+(M-1)(\beta_1+\beta_2))} \\ \vdots & \vdots & \ddots & \vdots \\ e^{j\sum_{k=1}^{N-1}\alpha_k} & e^{j\sum_{k=1}^{N-1}(\alpha_k+\beta_k)} & \cdots & e^{j\sum_{k=1}^{N-1}(\alpha_k+(M-1)\beta_k)} \end{bmatrix} \quad (2)$$

Here, N is the number of elements in each code vector, M is the number of code vectors, n is the element order in each code vector, $\alpha\_n$ is the phase parameter, and $\beta\_n$ is the phase difference parameter.

The method may further include receiving, from the base station, information on one codebook to be applied among a plurality of codebooks when the plurality of codebooks are defined.

In another aspect, provided is a User Equipment (UE) for transmitting Channel State Information (CSI) in a wireless communication system, the UE including: an Radio Frequency (RF) unit for transmitting/receiving a radio signal; and a processor for controlling the RF unit, wherein the processor: receives a Channel State Information Reference Signal (CSI-RS) from a base station through a multi-antenna port; and reports channel state information to the base station, the channel state information includes a Precoding Matrix Indicator (PMI) for indicating a specific code vector among a plurality of code vectors included in a codebook, and the codebook is a codebook in which phase differences between adjacent elements included in each code vector are set to be different from each other.

Advantageous Effects

According to one embodiment of the present invention, the codebook newly proposed in this specification has the effect that the complexity is relatively low while exhibiting a performance similar to that of VQ representing the second-best performance in the non-linear antenna array. Accordingly, the codebook proposed according to an embodiment of the present invention is flexibly applied to various channel environments in a non-linear antenna array situation (e.g., a cylindrical antenna array situation), thereby enabling performance of highly reliable beamforming.

The effects obtainable in the present disclosure are not limited to the above-mentioned effects, and other effects which are not mentioned can be clearly understood by those skilled in the art from the following descriptions.

DESCRIPTION OF DRAWINGS

The accompanying drawings, which are included herein as a part of the description for help understanding the present invention, provide embodiments of the present invention, and describe the technical features of the present invention with the description below.

MODE FOR INVENTION

Figure 1:
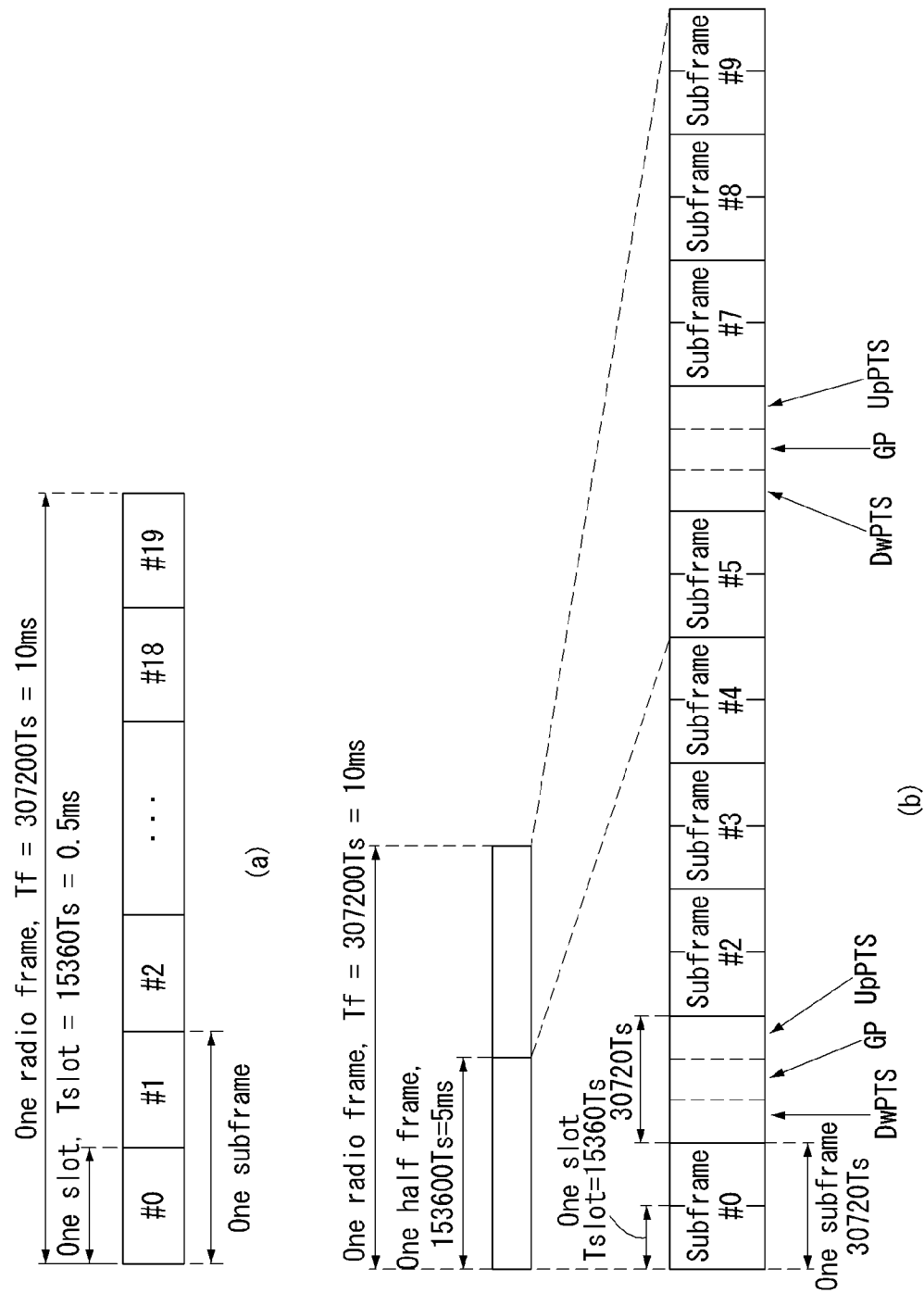
FIG. 1 illustrates the structure of a radio frame in a wireless communication system to which the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a UE node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of T_slot=15360*T_s=0.5 ms.

The UL-DL configuration may be classified into 7 types, and the position and/or the number of a DL subframe, a special subframe and a UL subframe are different for each configuration.

Table 2 represents configuration (length of DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
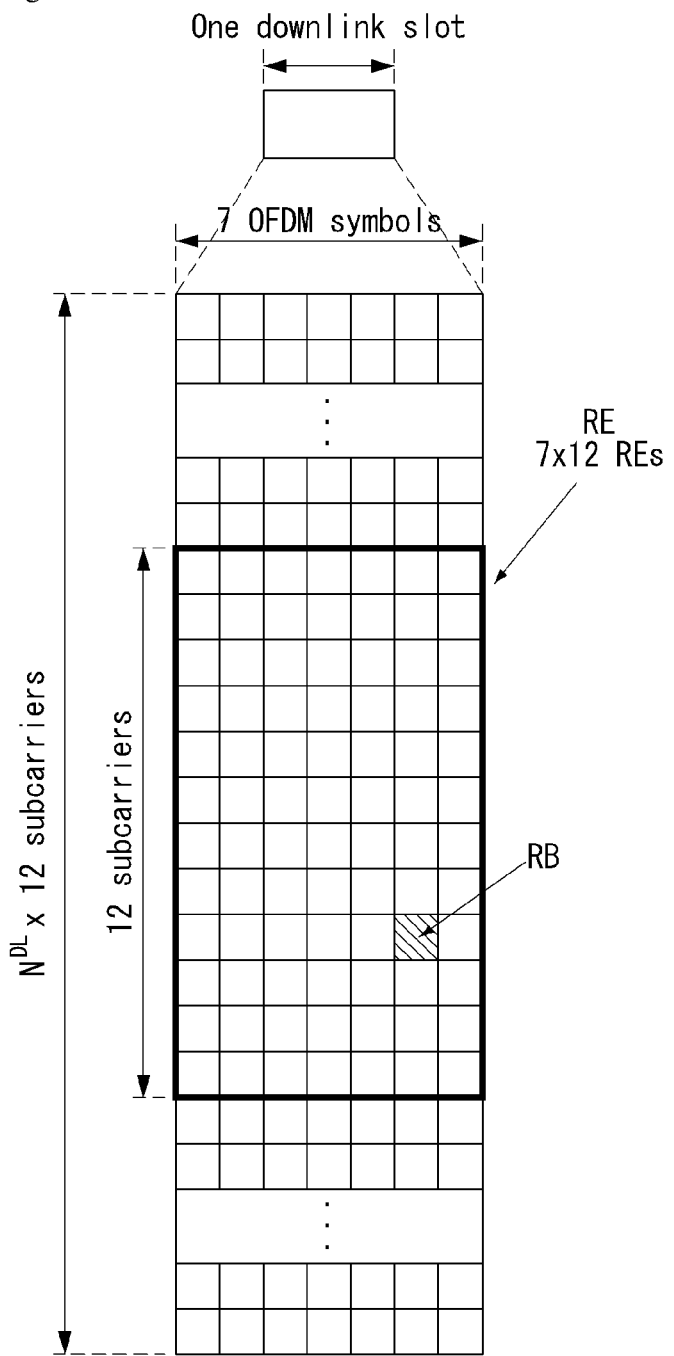
FIG. 2 is a diagram illustrating a resource grid for a downlink slot in a wireless communication system to which the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NADL included in a downlink slot depends on a downlink transmission bandwidth.

The structure of an uplink slot may be the same as that of a downlink slot.

Figure 3:
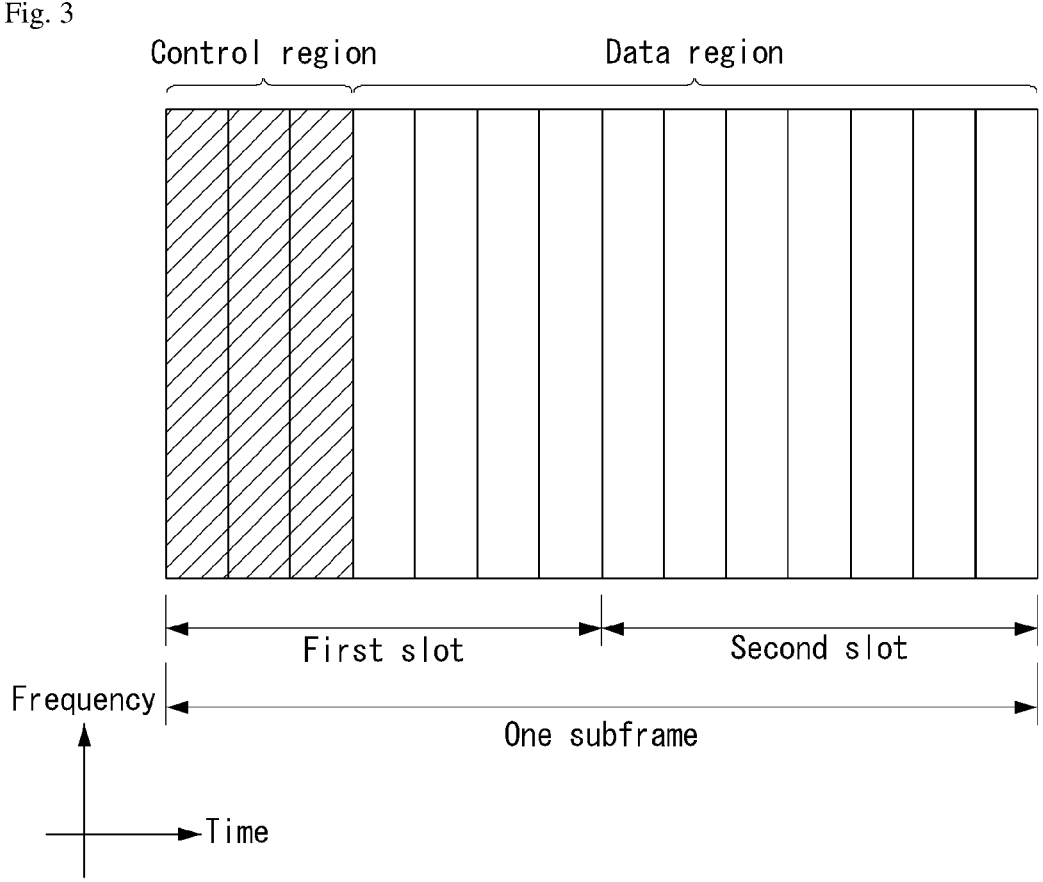
FIG. 3 illustrates a structure of downlink subframe in a wireless communication system to which the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

Figure 4:
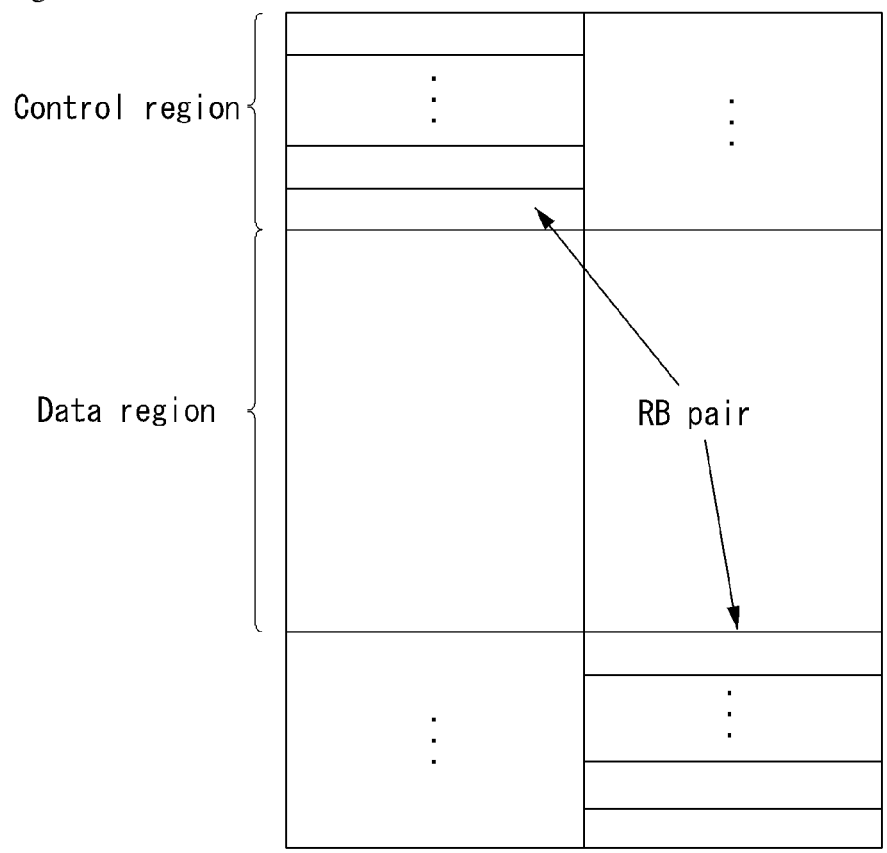
FIG. 4 illustrates a structure of uplink subframe in a wireless communication system to which the present invention may be applied.
Figure 4:
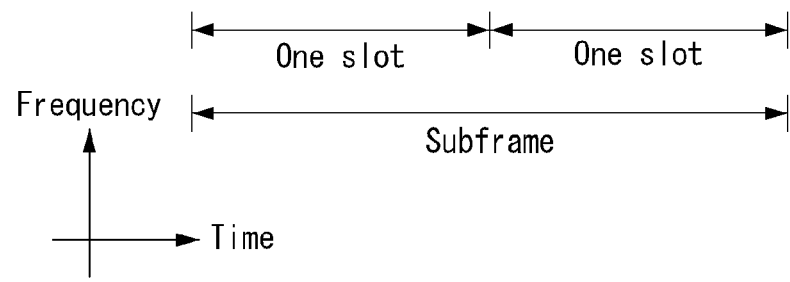

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
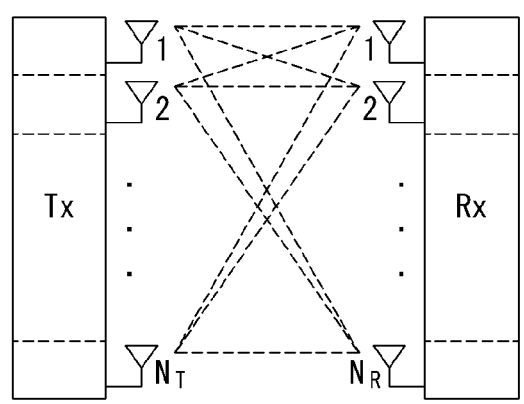
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T \quad \text{[Equation 2]}$$

Meanwhile, transmission power may be different in each of pieces of transmission information s_1, s_2, ..., s_NT. In this case, if pieces of transmission power are P_1, P_2, ..., P_NT, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & O & \\ 0 & & & P_{N_T} \end{bmatrix} \begin{bmatrix} s_1 \\ s_2 \\ M \\ s_{N_T} \end{bmatrix} = Ps \quad \text{[Equation 4]}$$

Meanwhile, the information vector having controlled transmission power in the Equation 4 is multiplied by a weight matrix W, thus forming N_T transmission signals x_1, x_2, ..., x_NT that are actually transmitted. In this case, the weight matrix functions to properly distribute the transmission information to antennas according to a transport channel condition. The following may be represented using the transmission signals x_1, x_2, ..., x_NT.

$$x = \begin{bmatrix} x_1 \\ x_2 \\ M \\ x_i \\ M \\ x_{N_T} \end{bmatrix} = \begin{bmatrix} w_{11} & w_{12} & \Lambda & w_{1N_T} \\ w_{21} & w_{22} & \Lambda & w_{2N_T} \\ M & & O & \\ w_{i1} & w_{i2} & \Lambda & w_{iN_T} \\ M & & O & \\ w_{N_T1} & w_{N_T2} & \Lambda & w_{N_TN_T} \end{bmatrix} \begin{bmatrix} \hat{s}_1 \\ \hat{s}_2 \\ M \\ \hat{s}_j \\ M \\ \hat{s}_{N_T} \end{bmatrix} = W\hat{s} = WPs \quad \text{[Equation 5]}$$

In this case, w_ij denotes weight between the i-th transmission antenna and the j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, ..., y_NR of the respective antennas are represented as follows using a vector y.

$$y = [y_1, y_2, \ldots, y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
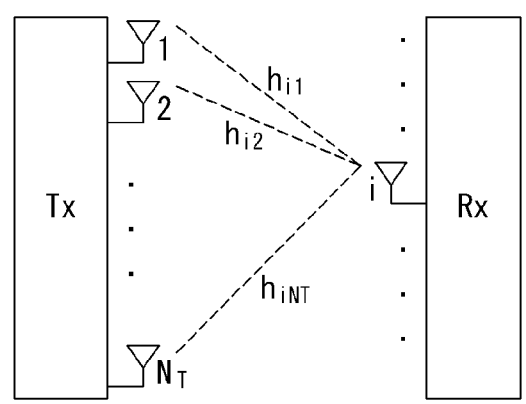
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}] \quad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ M \\ h_i^T \\ M \\ h_{N_R}^T \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R1} & h_{N_R2} & \Lambda & h_{N_RN_T} \end{bmatrix} \quad \text{[Equation 8]}$$

Meanwhile, Additive White Gaussian Noise (AWGN) is added to an actual channel after the actual channel experiences the channel matrix H. Accordingly, AWGN n_1, n_2, ..., n_NR added to the N_R reception antennas, respectively, are represented using a vector as follows.

$$n = [n_1, n_2, \ldots, n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$Y = \begin{bmatrix} y_1 \\ y_2 \\ M \\ y_i \\ M \\ y_{N_R} \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R1} & h_{N_R2} & \Lambda & h_{N_RN_T} \end{bmatrix} \begin{bmatrix} x_1 \\ x_2 \\ M \\ x_j \\ M \\ x_{N_T} \end{bmatrix} + \begin{bmatrix} n_1 \\ n_2 \\ M \\ n_i \\ M \\ n_{N_R} \end{bmatrix} = \quad \text{[Equation 10]}$$

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Massive MIMO

A MIMO system having a plurality of antennas may be referred to as a massive MIMO system, and has been attracting attention as a means for improving spectral efficiency, energy efficiency, and processing complexity.

In recent 3GPP, a discussion about a massive MIMO system has begun to meet the requirements of spectral efficiency of a future mobile communication system. The massive MIMO is also referred to as a Full-Dimension MIMO (FD-MIMO).

In a wireless communication system after LTE release (Rel: release)-12, the introduction of an Active Antenna System (AAS) is being considered.

Unlike existing passive antenna systems in which antennas and amplifiers capable of adjusting the phase and magnitude of the signals are separate, the AAS is a system in which each antenna is configured to include active elements such as amplifiers.

The AAS does not require separate cable, connector, or other hardware for connecting the amplifier and antenna according to the use of the active antenna, and thus has high efficiency in terms of energy and operational costs. In particular, since the AAS supports an electronic beam control method for each antenna, the AAS enables an advanced MIMO technology such as forming a sophisticated beam pattern considering a beam direction and a beam width, or forming a three-dimensional beam pattern.

With the introduction of advanced antenna systems such as AAS, large-scale MIMO structures with multiple input/output antennas and multi-dimensional antenna structures are also being considered. For example, when a two-dimensional (2D) antenna array is formed unlike an existing linear antenna array, a three-dimensional beam pattern may be formed by the active antenna of the AAS.

Figure 7:
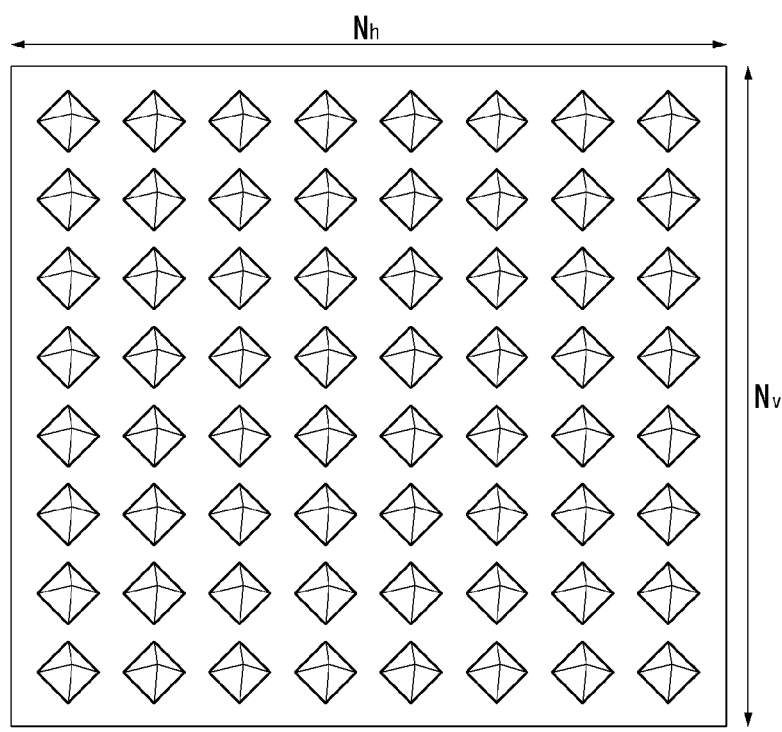
FIG. 7 illustrates a two-dimensional active antenna system having 64 antenna elements in a wireless communication system to which the present invention may be applied.

FIG. 7 illustrates a two-dimensional active antenna system having 64 antenna elements in a wireless communication system to which the present invention may be applied.

FIG. 7 illustrates a typical two-dimensional (2D) antenna array, and a case where $N\_t = N\_v \cdot N\_h$ antennas have a square shape as shown in FIG. 7 may be considered. Here, $N\_h$ represents the number of antenna rows in the horizontal direction, and $N\_v$ represents the number of antenna columns in the vertical direction.

When using such a 2D antenna array, radio waves can be controlled both vertically (elevation) and horizontally (azimuth) so as to control a transmission beam in a three-dimensional space. This type of wavelength control mechanism may be referred to as three-dimensional beamforming.

Figure 8:
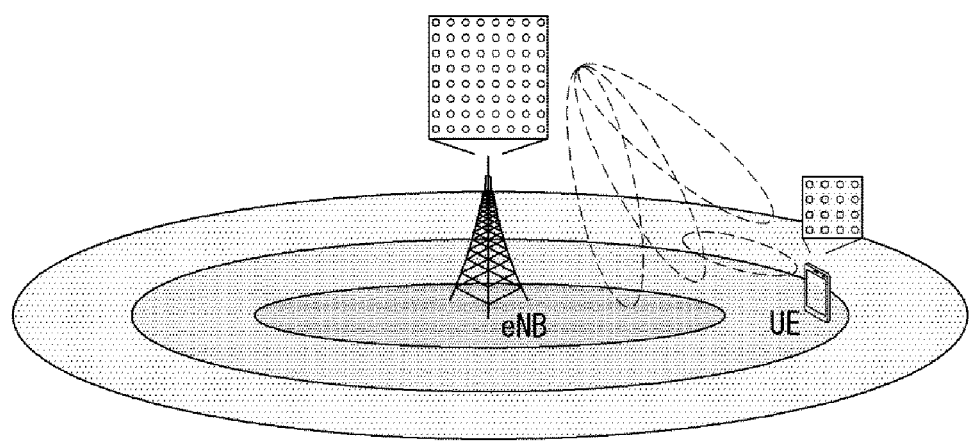
FIG. 8 illustrates a system in which a base station or a UE has a plurality of transmission/reception antennas capable of AAS-based 3D (3-Dimension) beamforming in a wireless communication system to which the present invention may be applied.

FIG. 8 illustrates a system in which a base station or a UE has a plurality of transmission/reception antennas capable of AAS-based 3D (3-Dimension) beamforming in a wireless communication system to which the present invention may be applied.

FIG. 8 illustrates a 3D MIMO system using a two-dimensional antenna array (i.e., 2D-AAS), which is schematization of the above-described example.

When the three-dimensional beam pattern is utilized from the viewpoint of the transmission antenna, it is possible to perform quasi-static or dynamic beam forming in the vertical direction as well as the horizontal direction of the beam, and applications such as vertical sector formation may be considered.

Also, from the viewpoint of the reception antenna, when a reception beam is formed using large-scale reception antennas, a signal power increasing effect according to an antenna array gain may be expected. Accordingly, in the case of uplink, the base station may receive a signal transmitted from the UE through a plurality of antennas. In this case, there is an advantage that the UE can set its own transmission power to be very low in consideration of the gain of the large-scale reception antennas in order to reduce interference.

Figure 9:
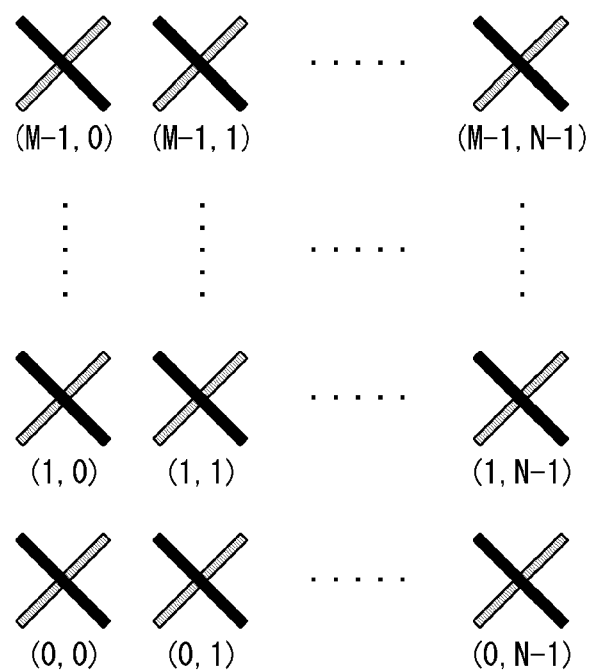
FIG. 9 illustrates a two-dimensional antenna system with cross polarization in a wireless communication system to which the present invention may be applied.

FIG. 9 illustrates a two-dimensional antenna system with cross polarization in a wireless communication system to which the present invention may be applied.

In the case of a 2D planar antenna array model considering polarization, the 2D planar antenna array model may be schematized as shown in FIG. 9.

Unlike an existing MIMO system according to passive antennas, the system based on active antennas can dynamically adjust the gain of the antenna element by applying weights to active elements (e.g., amplifiers) attached to (or included in) each antenna element. Since the radiation pattern depends on the antenna arrangement such as the number of antenna elements, antenna spacing, etc., the antenna system may be modeled at the antenna element level.

An antenna array model like the example of FIG. 9 may be represented by (M, N, P), which correspond to parameters characterizing the antenna array structure.

M denotes the number of antenna elements (i.e., the number of antenna elements having a slant of +45 degrees in each column or the number of antenna elements having a slant of −45 degrees in the column) having the same polarization in each column (i.e., in the vertical direction).

N denotes the number of columns in the horizontal direction (i.e., the number of antenna elements in the horizontal direction).

P denotes the number of dimensions of polarization. As shown in FIG. 9, P=2 in the case of cross polarization, and P=1 in the case of co-polarization.

An antenna port may be mapped to a physical antenna element. The antenna port may be defined by a reference signal associated with the corresponding antenna port. For example, in an LTE system, the antenna port 0 may be associated with a Cell-specific Reference Signal (CRS), and the antenna port 6 may be associated with a Positioning Reference Signal (PRS).

For example, the antenna port and the physical antenna element may be mapped one-to-one. This may correspond to the case where a single cross polarization antenna element is used for downlink MIMO or downlink transmission diversity. For example, the antenna port 0 may be mapped to one physical antenna element while the antenna port 1 may be mapped to another physical antenna element. In this case, there are two downlink transmissions for a UE. One is associated with the reference signal for the antenna port 0, and the other is associated with the reference signal for the antenna port 1.

In another example, a single antenna port may be mapped to multiple physical antenna elements. This may be a case of being used for beamforming. Beamforming may use multiple physical antenna elements to direct downlink transmission to a particular UE. This may be achieved by using an antenna array which generally includes multiple columns of multiple cross polarization antenna elements. In this case, for the UE, there is a single downlink transmission occurring from a single antenna port. One is associated with CRS for the antenna port 0, and the other is associated with CRS for the antenna port 1.

That is, the antenna port indicates downlink transmission at the UE, not the actual downlink transmission transmitted from the physical antenna element at the base station.

In another example, a plurality of antenna ports are used for downlink transmission, but each antenna port may be mapped to multiple physical antenna elements. This may correspond to a case where the antenna array is used for downlink MIMO or downlink diversity. For example, the antenna ports 0 and 1 may each be mapped to multiple physical antenna elements. In this case, there are two downlink transmissions for a UE. One is associated with the reference signal for the antenna port 0, and the other is associated with the reference signal for the antenna port 1.

In FD-MIMO, MIMO precoding of the data stream may pass through antenna port virtualization, transceiver unit (TXRU) virtualization, and antenna element pattern.

The antenna port virtualization means that the stream on the antenna port is precoded on the TXRU. The TXRU virtualization means that the TXRU signal is precoded on the antenna element. In the case of the antenna element pattern, a signal radiated from the antenna element may have a directional gain pattern.

In existing transceiver modeling, a static one-to-one mapping between the antenna port and the TXRU is assumed, and the TXRU virtualization effect is combined into a static (TXRU) antenna pattern that includes all of TXRU virtualization and antenna element pattern effects.

The antenna port virtualization may be performed in a frequency-selective manner. In LTE, the antenna port is defined together with a reference signal (or pilot). For example, for precoded data transmission on the antenna port, the DMRS is transmitted in the same bandwidth as the data signal, and all the DMRS and data are precoded by the same precoder (or the same TXRU virtual precoding). For CSI measurement, the CSI-RS is transmitted through multiple antenna ports. For CSI-RS transmission, a precoder that characterizes the mapping between the CSI-RS port and the TXRU such that a UE can estimate a TXRU virtualization precoding matrix for the data precoding vector may be designed with a unique matrix.

The TXRU virtualization method includes discussions of one-dimensional TXRU virtualization (1D TXRU virtualization) and two-dimensional TXRU virtualization (2D TXRU virtualization), which will be described with reference to the following drawings.

Figure 10:
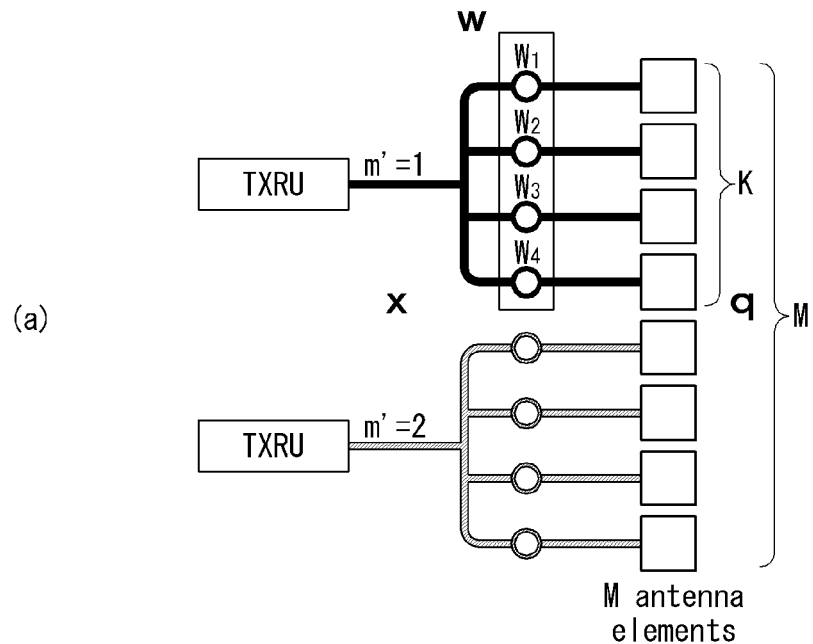
FIG. 10 illustrates a transceiver unit model in a wireless communication system to which the present invention may be applied.
Figure 10:
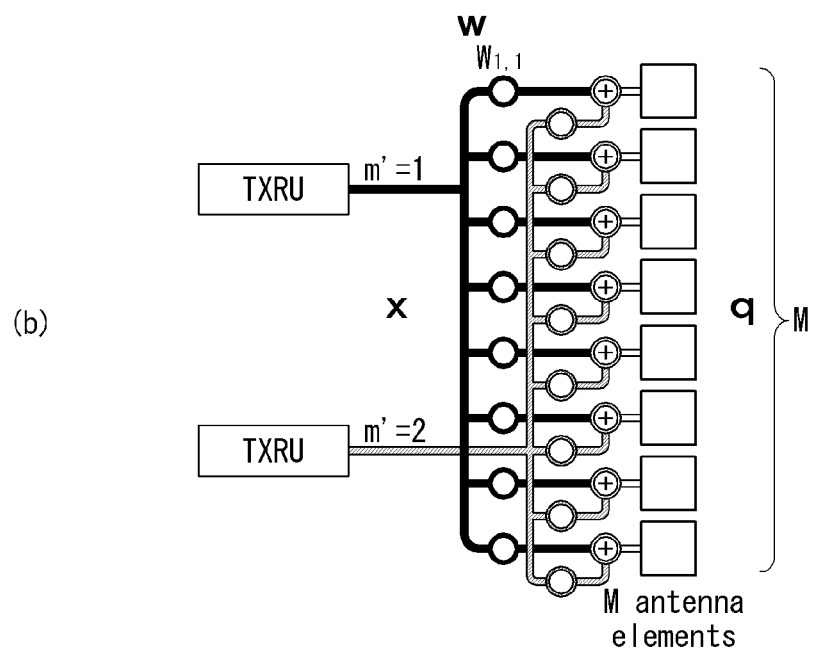

FIG. 10 illustrates a transceiver unit model in a wireless communication system to which the present invention may be applied.

In 1D TXRU virtualization, M_TXRU number of TXRUs are associated with M antenna elements that are configured with a single column antenna array with co-polarization.

In 2D TXRU virtualization, the TXRU model configuration corresponding to the antenna array model configuration (M, N, P) of FIG. 9 may be represented by (M_TXRU, N, P). Here, M_TXRU denotes the number of TXRUs existing at the same row of 2D and the same polarization, and M_TXRU≤M is always satisfied. That is, the total number of TXRUs is equal to M_TXRU×N×P.

The TXRU virtualization model is classified into a TXRU virtualization model option-1: a sub-array partition model and a 12-bit sub-array partition model as shown in FIG. 10A, and TXRU virtualization model option-2: full-connection model as shown in FIG. 10B according to the correlation between the antenna element and the TXRU.

Referring to FIG. 10A, in the case of the sub-array partition model, an antenna element is divided into a plurality of antenna element groups, and each TXRU is connected to one of the groups.

Referring to FIG. 10B, in the case of the full-connection model, signals of multiple TXRUs are combined and transmitted to a single antenna element (or an array of antenna elements).

In FIG. 10, q is a transmission signal vector of M co-polarized antenna elements in one column. w is a wideband TXRU virtualization weight vector, and W is a wideband TXRU virtualization weight matrix. x is a signal vector of M_TXRU number of TXRUs.

Here, the mapping between the antenna port and the TXRUs may be one-to-one or one-to-many.

In FIG. 10, the TXRU-to-element mapping between the TXRU and the antenna element is merely an example, and the present invention is not limited thereto. The present invention may also be equally applied to the mapping between the TXRU and the antenna element which can be implemented in other various forms in terms of hardware.

Codebook Design Method for Supporting Various Antenna Array Structures

One of the important directions of mobile communication technology evolution is an increase of the data transmission rate through an increase of the channel capacity. For this, a method of increasing the frequency reuse frequency by utilizing a small cell, and a Multiple-Input Multiple-Output (MIMO) technology using a large number of antennas are currently being developed. An important element technology for MIMO transmission is to perform beamforming through an efficient codebook design that accurately recognizes the channel environment.

Typical codebooks used for MIMO transmission which is used in existing cellular networks are specialized in a uniform linear antenna array environment. In the small cell environment, if the base station type antenna is installed in each cell, the cost increases. Accordingly, in addition to the existing Uniform Linear Array (ULA) and Uniform Rectangular Array (URA), a change of the antenna array form is required in accordance with the shape of a structure in which antennas can be easily installed. For example, the antennas may be installed along the surface of lamps, streetlights, road signs, street trees, etc. In this case, the antenna may be arranged in a cylindrical shape. In this antenna array, since the propagation distance and time are irregular according to the shape of the structure, it is difficult to apply the beam forming method applied to the existing linear antenna array environment, and it is necessary to apply a new beam forming different from the corresponding method.

Thus, a codebook design method suitable for this new type of antenna array environment will be proposed in this specification. Particularly, in this specification, a design result of a Uniform Circular Array (UCA) antenna array arranged along the surface of a cylindrical structure will be proposed through equations as a concrete embodiment of this new antenna array environment. While the LTE 4-Tx and LTE-A 8-Tx codebooks used in the existing uniform linear array have characteristics similar to the DFT matrix, the proposed method of the present invention uses a parameter value suitable for the UCA element array characteristics to define the codebook. Hereinafter, through the performance evaluation of the proposed codebook, it will be proved that there is a great improvement in the performance of the codebook proposed in the present specification compared to the codebook which has been used in the changed environment.

In this specification, parameters necessary for designing a codebook for various antenna array structures resulting from small cell structure characteristics are generalized and defined. As a specific example of the present invention, a configuration method of parameters suitable for a cylindrical antenna is proposed, but it is not limited thereto and may be extended to various antenna shapes.

The 'base station' described in the present specification corresponds to a transmission point (TP)/reception point (RP) of a cell, a base station, an eNB, a sector, a Remote Radio Head (RRH), etc., and may be used as a generic term to distinguish component carriers at a specific transmission/reception point. Hereinafter, the proposed method will be described based on the 3GPP LTE system for convenience of explanation. However, the scope of the system to which the proposed method is applied may be extended to other systems other than the 3GPP LTE system.

As described above, the present disclosure proposes a general parameterized codebook (or scalable/configurable codebook) for various antenna array structures. First, the parameters $\alpha_k, \beta_k, \chi_k$ are introduced and utilized for code vector generation, and at least a portion of which may be omitted according to the embodiment. When the phase of the channel information corresponding to the n-th antenna element in the array having N antenna elements is defined as $\phi_n$ (n=0, 1, . . . , N−1) and the phase difference between adjacent antenna elements is defined as $\theta_n$, the relationship between the two parameters may be expressed as Equation (12) below.

$$\theta_n = \phi_n - \phi_{n-1}, \, n=1,2,\ldots,N-1 \quad \text{[Equation 12]}$$

Here, it is important to design a code vector element capable of efficiently expressing the angle $\theta_n$. Three parameters $\alpha_n, \beta_n, \chi_n$ may be used to represent $\theta_n$, where $\alpha_n$ denotes the phase characteristic (corresponding to long term and/or wideband precoder W1 in the LTE-A system) of the first code vector, $\beta_n$ denotes a phase difference characteristic (corresponding to short term and/or sub-band W2) between adjacent code vectors, and $\chi_n$ denotes a phase difference correction/compensation characteristic/parameter according to the shape of the antenna array. When the number of feedback bits for selecting a code vector is represented by B, the size of the codebook, i.e., the number of code vectors is $M=2^B$, and the codebook matrix W may be expressed as Equation (13) below.

$$W=[w_0 w_1 \cdots w_{M-1}] \quad \text{[Equation 13]}$$

In Equation (13), w_m is an m-th code vector, and may be expressed as Equation (14) below.

$$w_m = [w_{0,m} w_{1,m} \cdots w_{N-1,m}]^T, \, m=0,1,\ldots,M-1 \quad \text{[Equation 14]}$$

In Equation (14), w_n, m denotes the n-th element of the m-th code vector, and the phase difference between adjacent elements in the code vector may be expressed as a function of $\alpha_n, \beta_n, \chi_n$ below.

$$\angle(w_{0,m}) = 0, n = 0 \quad \text{[Equation 15]}$$
$$\angle(w_{n,m}) - \angle(w_{n-1,m}) = f_m(\alpha_n, \beta_n, \chi_n),$$
$$n = 1, 2, \ldots, N-1$$
$$\angle(w_{n,m}) = \sum_{k=1}^{n} f_m(\alpha_k, \beta_k, \chi_k),$$
$$n = 1, 2, \ldots, N-1$$

In Equation (15), $f_m(\bullet)$ is a function representing the phase difference between adjacent elements in the m-th code vector.

Hereinafter, concrete codebook design embodiments will be described using Equations (12) to (15) described above.

1. Codebook Design Example 1—Using $\alpha, \beta, \chi$

In this design embodiment, a method of using $\alpha, \beta, \chi$ among the codebook design methods for a cylindrical antenna array that is one example of various antenna arrangement models is described. In this design embodiment, the parameters $\alpha_n, \beta_n, \chi_n$ may be defined as Equation (16) below.

[Equation 16]

$$\alpha_n = \alpha, \, \beta_n = \beta, \, \chi_n = (n-1)\chi, \, n=1,2,\ldots,N-1 \quad (7)$$

In addition, the function $f_m(\bullet)$ may be defined as Equation (17) below.

$$f_m(\alpha_n, \beta_n, \chi_n) = \alpha + m\beta + (n-1)\chi, \, m=0,1,\ldots,M-1, \, n=1, 2,\ldots,N-1 \quad \text{[Equation 17]}$$

When Equations (16) and (17) are defined as above, the n-th element phase of the m-th code vector may be defined as Equation (18) below.

$$\angle(w_{n,m}) = \sum_{k=1}^{n} f_m(\alpha_n, \beta_n, \chi_n) = n(\alpha + m\beta) + \sum_{k=1}^{n}(k-1)\chi \quad \text{[Equation 18]}$$
$$n = 1, 2, \ldots, N-1$$

That is, a fixed value of $\alpha_n = \alpha$ and $\beta_n = \beta$ is used to express $\theta_n$, and $\chi_n = (n-1)\chi$ is used. When $F_n = \Sigma_{k=1}^{n-1} k$, the n-th element of the m-th code vector of the codebook proposed in the present embodiment may be expressed by Equation (19) below.

[Equation 19]

$$w_{n,m} = \frac{1}{\sqrt{N}} \exp\{j(n(\alpha + m\beta) + F_n \chi)\}, \quad \text{[Equation 19]}$$
$$n = 1, 2, \ldots, N-1$$

Based on Equation (19), the final N×M codebook matrix proposed in this specification may be derived as Equation (20) below.

$$W = [\begin{array}{cccc} w_0 & w_1 & \ldots & w_{M-1} \end{array}]$$

[Equation 19]

$$= \frac{1}{\sqrt{N}} \begin{bmatrix} 1 & 1 & \ldots & 1 \\ e^{j\alpha} & e^{j(\alpha+\beta)} & \ldots & e^{j(\alpha+(M-1)\beta)} \\ e^{j(2\alpha+\chi)} & e^{j(2(\alpha+\beta)+\chi)} & \ldots & e^{j(2(\alpha+(M-1)\beta)+\chi)} \\ \vdots & \vdots & \ddots & \vdots \\ e^{j((N-1)\alpha+F_{N-1}\chi)} & e^{j((N-1)(\alpha+\beta)+F_{N-1}\chi)} & \ldots & e^{j((N-1)(\alpha+(M-1)\beta)+F_{N-1}\chi)} \end{bmatrix}$$

Referring to Equation (19), beamforming may be applied by sequentially multiplying the elements of each column and the signals transmitted through each antenna port as precoding vectors.

In the existing LTE system, the phase difference (n(α+mβ)) between the elements of each column is defined/set at a uniform interval according to the linear antenna array environment.

However, since the environment to which the proposed codebook matrix is applied is a non-linear antenna array environment, it is necessary to newly define/set a phase difference between the elements of each column, considering that the interval between antenna ports is not constant and is non-uniform. Accordingly, in this embodiment, it is proposed that the phase difference between the elements of each column is set/defined differently at non-uniform intervals of a form in which the compensation parameter χ is additionally considered, based on the non-linear antenna array environment. That is, the phase difference between the elements of each column in the codebook matrix may be defined to be different from each other at non-uniform intervals like (n(α+mβ)+F_{nχ}). Particularly, in this embodiment, the compensation parameter χ also has a characteristic of increasing at non-uniform intervals for each column element. The compensation parameter χ may be set and signaled to a specific value by the base station and/or the UE according to the type of antenna array, and a detailed description thereof will be described below with reference to FIGS. 12 and 13.

2. Codebook Design Example 2—Using ($\alpha_n$, $\beta_n$)

In this design embodiment, a method of using $\alpha_n$, $\beta_n$ among codebook design methods for a cylindrical antenna array that is one example of various antenna placement models is described. This design embodiment 2 of the present invention is a more generalized form than the embodiment 1 described above, and proposes a codebook matrix to be applied to the non-linear antenna environment by reusing $\alpha_n$, $\beta_n$ defined in the existing system, instead of introducing the compensation parameter χ.

In this embodiment, the values $\alpha_n$, $\beta_n$ are set differently/independently according to n, and set to $\chi_n=0$ for all n. The function $f_m(\bullet)$ may be defined as Equation (20) below.

$$f_m(\alpha_n, \beta_n, \chi_n) = \alpha_n + m\beta_n, \quad m=0,1,\ldots,M-1, \quad n=1,2,\ldots,N-1$$

[Equation 20]

The n-th element phase of the m-th code vector may be defined as Equation (21) below.

$$\measuredangle(w_{n,m}) = \sum_{k=1}^{n} f_m(\alpha_k, \beta_k, \chi_k) = \sum_{k=1}^{n} (\alpha_k + m\beta_k),$$

$$n = 1, 2, \ldots, N-1$$

[Equation 21]

When Equations (20) and (21) are defined as above, the n-th element of the m-th code vector of the codebook may be expressed as Equation (22).

$$w_{n,m} = \frac{1}{\sqrt{N}} \exp\left( j \sum_{k=1}^{n} (\alpha_k + m\beta_k) \right), n = 1, 2, \ldots, N-1$$

[Equation 22]

Based on Equation (22), the N×M codebook matrix proposed in this embodiment may be configured as Equation (23) below.

[Equation 23]

$$W = \frac{1}{\sqrt{N}} \begin{bmatrix} 1 & 1 & \ldots & 1 \\ e^{j\alpha_1} & e^{j(\alpha_1+\beta_1)} & \ldots & e^{j(\alpha_1+(M-1)\beta_1)} \\ e^{j(\alpha_1+\alpha_2)} & e^{j(\alpha_1+\alpha_2+\beta_1+\beta_2)} & \ldots & e^{j(\alpha_1+\alpha_2+(M-1)(\beta_1+\beta_2))} \\ \vdots & \vdots & \ddots & \vdots \\ e^{j\sum_{k=1}^{N-1}\alpha_k} & e^{j\sum_{k=1}^{N-1}(\alpha_k+\beta_k)} & \ldots & e^{j\sum_{k=1}^{N-1}(\alpha_k+(M-1)\beta_k)} \end{bmatrix}$$

Referring to Equation (23), in this embodiment, the phase difference between the elements of each column is set/defined differently at non-uniform interval like $\sum_{k=1}^{n}(\alpha_k+m\beta_k)$. In this case, the parameters related to the phase increasing at non-uniform intervals may be set and signaled to a specific value by the base station and/or the UE according to the type of the antenna array.

Any of the codebook design embodiments 1 and 2 described above may be selectively applied, or both embodiments may be applied. When both embodiments are applied, the base station may inform the UE through the RRC signaling which codebook is set according to an embodiment.

Hereinafter, a channel model for explaining a specific application example of the above-described embodiments will be described.

Figure 11:
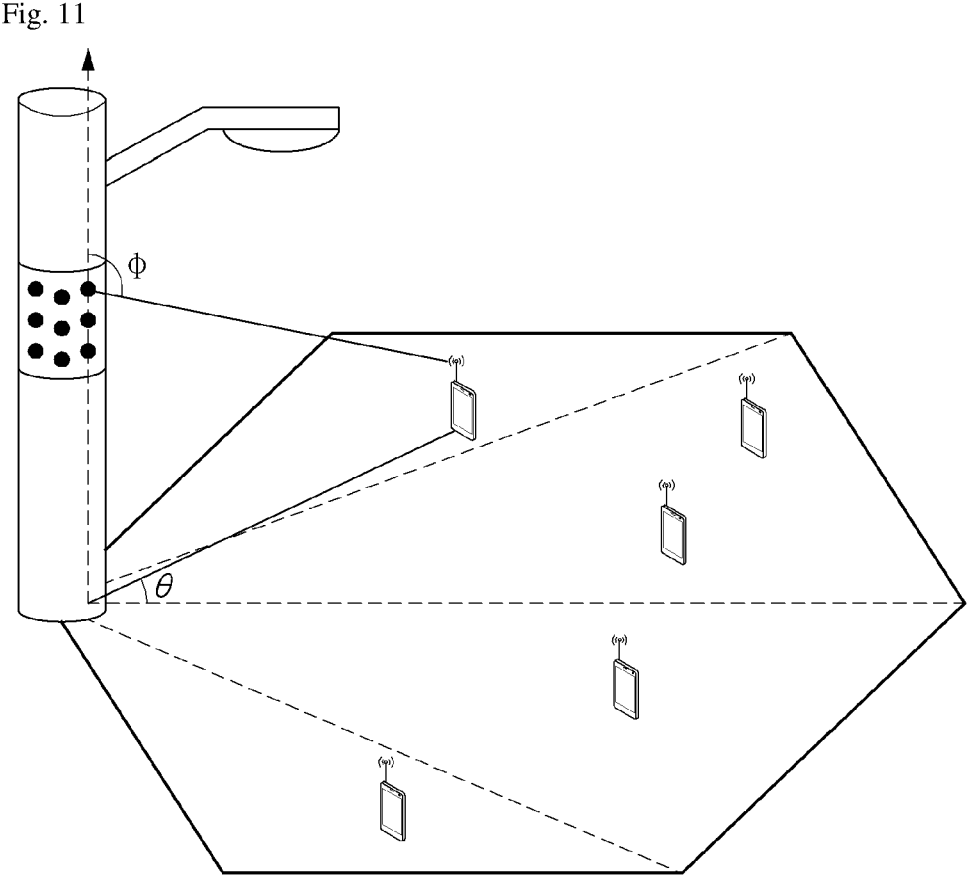
FIG. 11 is a diagram illustrating a signal transmission environment of a uniform cylindrical antenna system to which 3D SCM is applied according to an embodiment of the present invention.

FIG. 11 is a diagram illustrating a signal transmission environment of a uniform cylindrical antenna system to which 3D SCM is applied according to an embodiment of the present invention.

The channel model shown in FIG. 11 assumes that a 3D Dimensional Spatial Channel Model (SCM) proposed in 3GPP is applied. The 3D SCM is a channel model that represents the location distribution of a cluster and UEs in three dimensions in a similar manner to the reality. Since the 3D SCM enables multi-path transmission using the environment generated as above, the 3D SCM is suitable for representing channels of the MIMO transmission environment. In this channel model, a channel is formed according to the three-dimensional position, the azimuth angle and the zenith angle of a UE. In FIG. 11, θ represents the azimuth angle for a specific UE, and ϕ represents the zenith angle.

Hereinafter, the channel characteristics of the 3D-SCM described above will be analyzed, and how to set each parameter of the codebook matrix proposed in the present specification will be described in detail based on the analysis.

In order to analyze the characteristics, the base station refers to an example having a 4×4 antenna structure with four antennas for each of the horizontal and vertical directions. In this case, the phase of the n-th (n=0, 1, 2, 3) antenna element is defined as $\phi_n$. The phase difference $\theta_n$ between the channels generated in each antenna is defined as shown in Equation (12). In order to design the codebook for the horizontal antenna, the distribution of the phase differences between the adjacent channels of the UE and the base station which is formed by the statistical characteristics of the channels is shown in FIG. 12 according to the azimuth angles at which the UEs are located.

Figure 12:
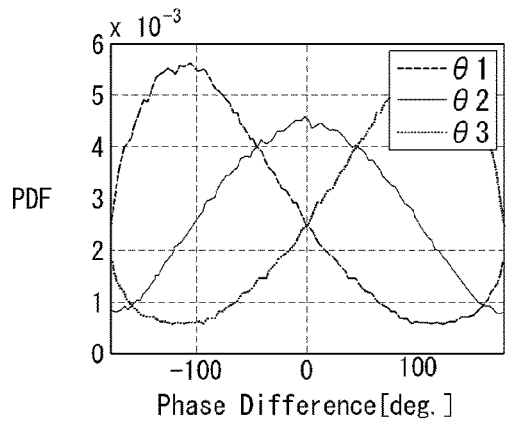
FIG. 12 is a graph illustrating experimental results on a phase difference between adjacent channels according to an azimuth angle according to an embodiment of the present invention.
Figure 12:
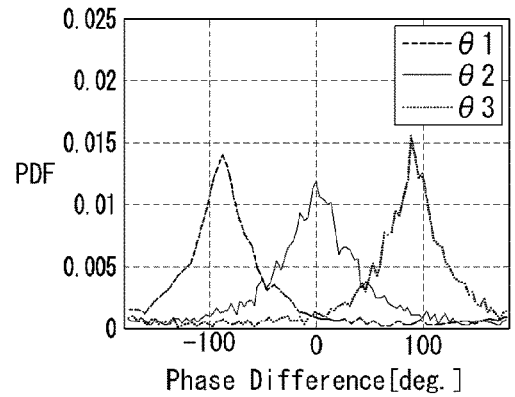
Figure 12:
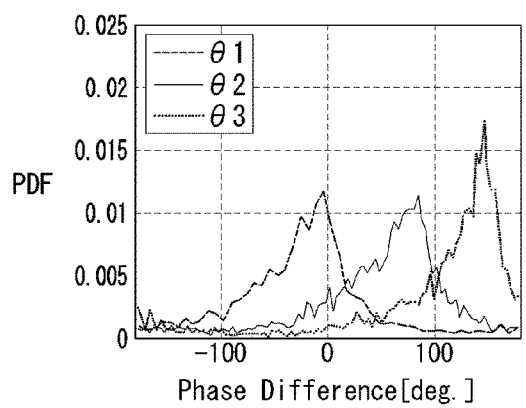
Figure 12:
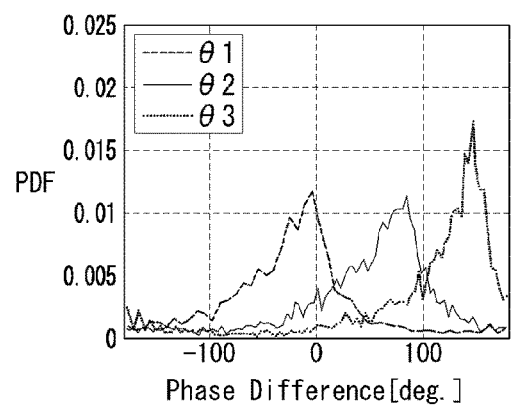
Figure 12:
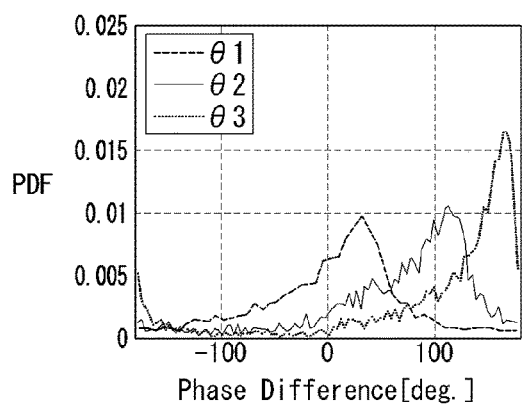
Figure 12:
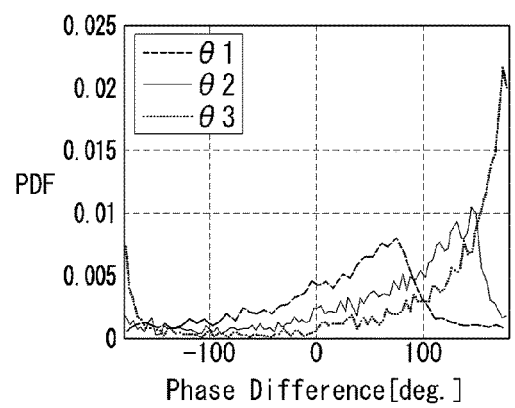

FIG. 12 is a graph illustrating experimental results on a phase difference between adjacent channels according to an azimuth angle according to an embodiment of the present invention.

Referring to FIG. 12, it can be seen that the distribution of the channel phase difference differs according to the location of the UE, and based thereon, a codebook suitable for the non-linear antenna environment may be designed through the parameters.

More specifically, the distributions of each of $\theta_1$, $\theta_2$, $\theta_3$ are different, which means that the phase of the adjacent channel varies according to the relative antenna location based on a UE. The reason why the distribution of $\theta_1$, $\theta_2$, $\theta_3$ differs even at the same azimuth angle unlike uniform linear antenna array of a uniform interval is that the antennas of the base station is arranged along the curved surface of the cylinder rather than the plane due to the characteristics of the cylindrical antenna array.

Figure 13:
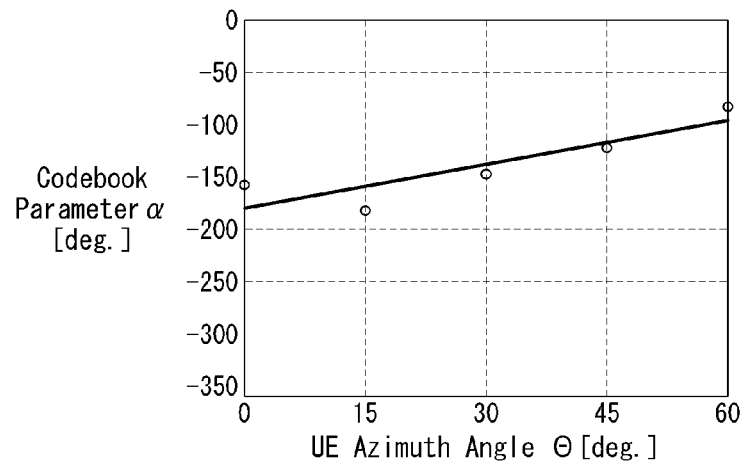
FIG. 13 is a graph illustrating an approximation result using a linear function and a change of a parameter value according to an azimuth angle.
Figure 13:
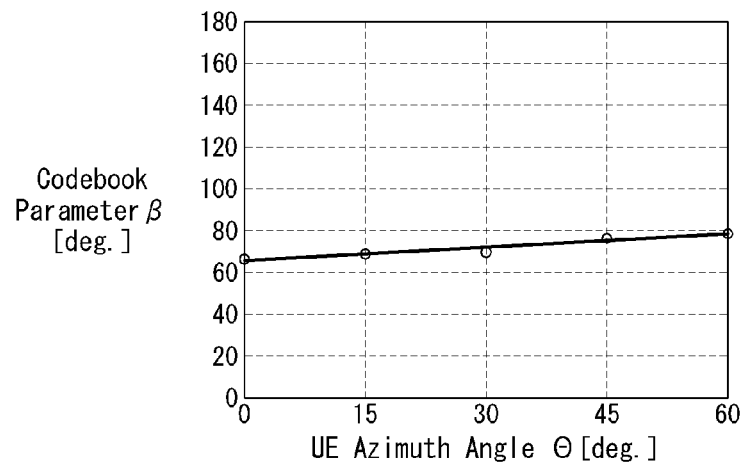
Figure 13:
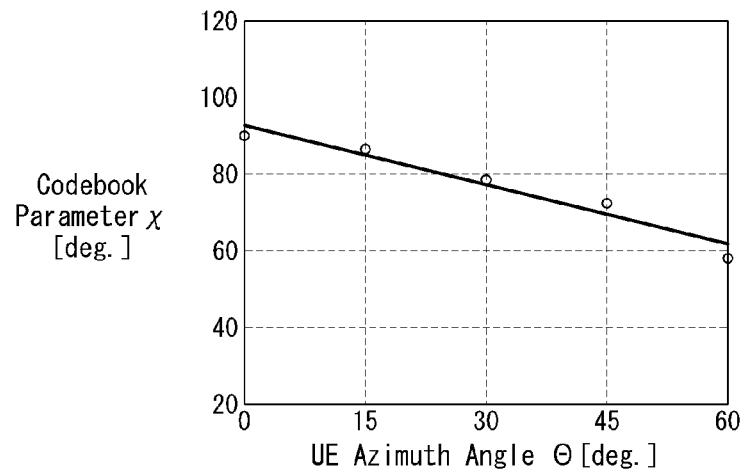

In order to find the parameters $\alpha$, $\beta$, $\chi$ necessary for configuring the codebook according to the codebook design embodiment 1 using the experimental result/graph shown in FIG. 12, searches are performed for the cases where the azimuth angle at which a UE is located is 0 degree, 15 degrees, 30 degrees, 45 degrees, and 60 degrees when the number of codebook bits B is equal to 2, and the search results are shown in FIG. 13.

FIG. 13 is a graph illustrating an approximation result using a linear function and a change of a parameter value according to an azimuth angle. In FIG. 13, the parameter search result value according to the azimuth angle is indicated by 'o'. The linear approximation is performed based on the search result values shown in FIG. 13, and the linear approximation is expressed as a linear function with respect to $\theta$ as shown in Table 3 below.

TABLE 3

| | α [deg.] | β [deg.] | χ [deg.] |
|---|---|---|---|
| B = 2 | α = 1.39θ − 180° | β = 0.21θ + 65.2° | χ = −0.52θ + 92.4° |

Referring to Table 3, in the case where the azimuth angle $\theta$ of a UE is a negative number, the parameter result value may appear symmetrically with respect to the case where the parameter result value is a positive number. Thus, through the result of Table 3, the parameter values $\alpha$, $\beta$, $\chi$ used in the codebook of the codebook design embodiment 1 can be generated/acquired using the UE azimuth information.

Figure 14:
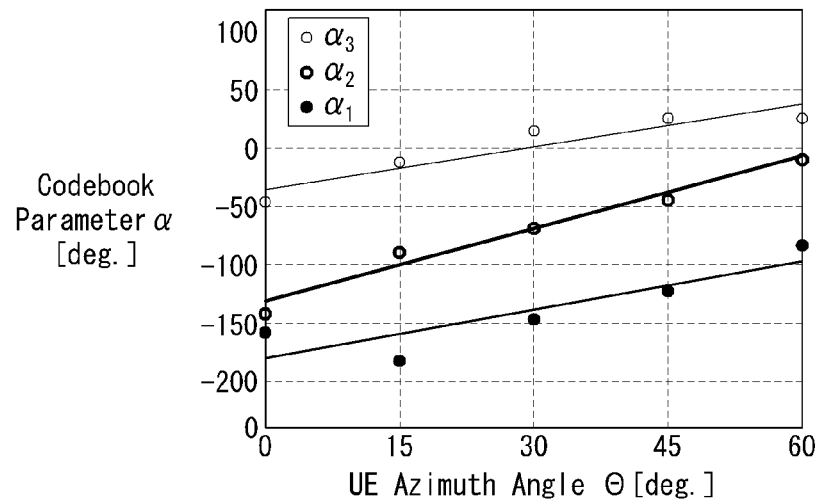
FIG. 14 is a graph illustrating an approximation result using a linear function and a change of a parameter value according to an azimuth angle.
Figure 14:
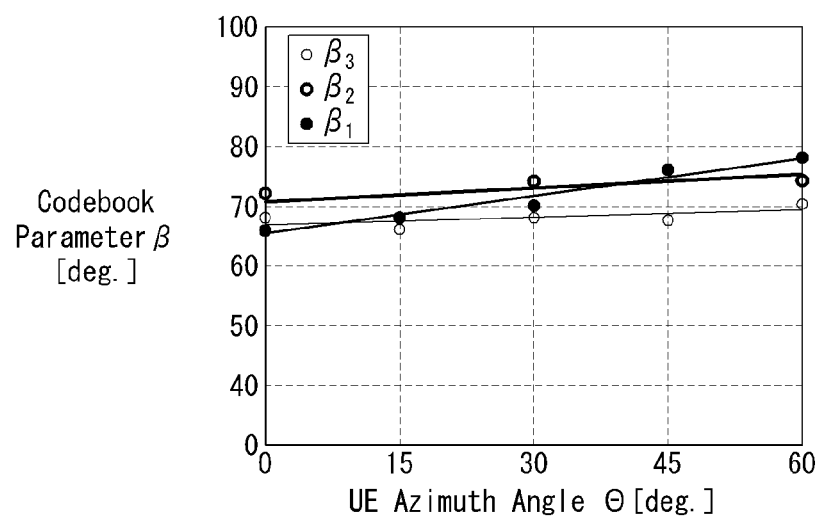

In order to find the parameters $\alpha_n$, $\beta_n$ necessary for configuring the codebook according to the codebook design embodiment 2 using the experimental result/graph shown in FIG. 12, searches are performed for the cases where the azimuth angle at which a UE is located is 0 degree, 15 degrees, 30 degrees, 45 degrees, and 60 degrees when the number of codebook bits B is equal to 2, and the search results are shown in FIG. 14.

FIG. 14 is a graph illustrating an approximation result using a linear function and a change of a parameter value according to an azimuth angle. In FIG. 14, the parameter search result value according to the azimuth angle is indicated by 'o'. The linear approximation is performed based on the search result values shown in FIG. 14, and the linear approximation is expressed by a linear function with respect to $\theta$ as shown in Table 4 below.

TABLE 4

| | $\alpha_n$ [deg.] | $\beta_n$ [deg.] |
|---|---|---|
| B = 2 | $\alpha_1$ = 1.2θ − 34.8° | $\beta_1$ = 0.04θ + 66.8° |
| | $\alpha_2$ = 2.1θ − 132° | $\beta_2$ = 0.21θ + 70.4° |

Referring to Table 4, in the case where the azimuth angle $\theta$ of a UE is a negative number, the parameter result value may appear symmetrically with respect to the case where the parameter result value is a positive number. Thus, through the result of Table 4, the parameter values $\alpha_n$, $\beta_n$ used in the codebook of the codebook design embodiment 2 can be generated/acquired using the UE azimuth information.

Based on the above-described embodiments (FIGS. 12 to 14), the base station may set reference UEs located at reference azimuth angles, and thus may acquire a phase difference between adjacent channels according to the respective azimuth angles. In addition, the base station may perform linear approximation using the acquired phase difference to acquire parameter values necessary for generating a codebook. In this case, the acquired parameter values may be defined as a form of configurable/semi-persistent/semi-static/semi-dynamic as shown in Table 3. The base station may set the obtained parameter values to the UE through RRC signaling or the like.

Hereinafter, the performance evaluation of the present invention and the existing codebook in 3D SCM environment described above will be described.

Figure 15:
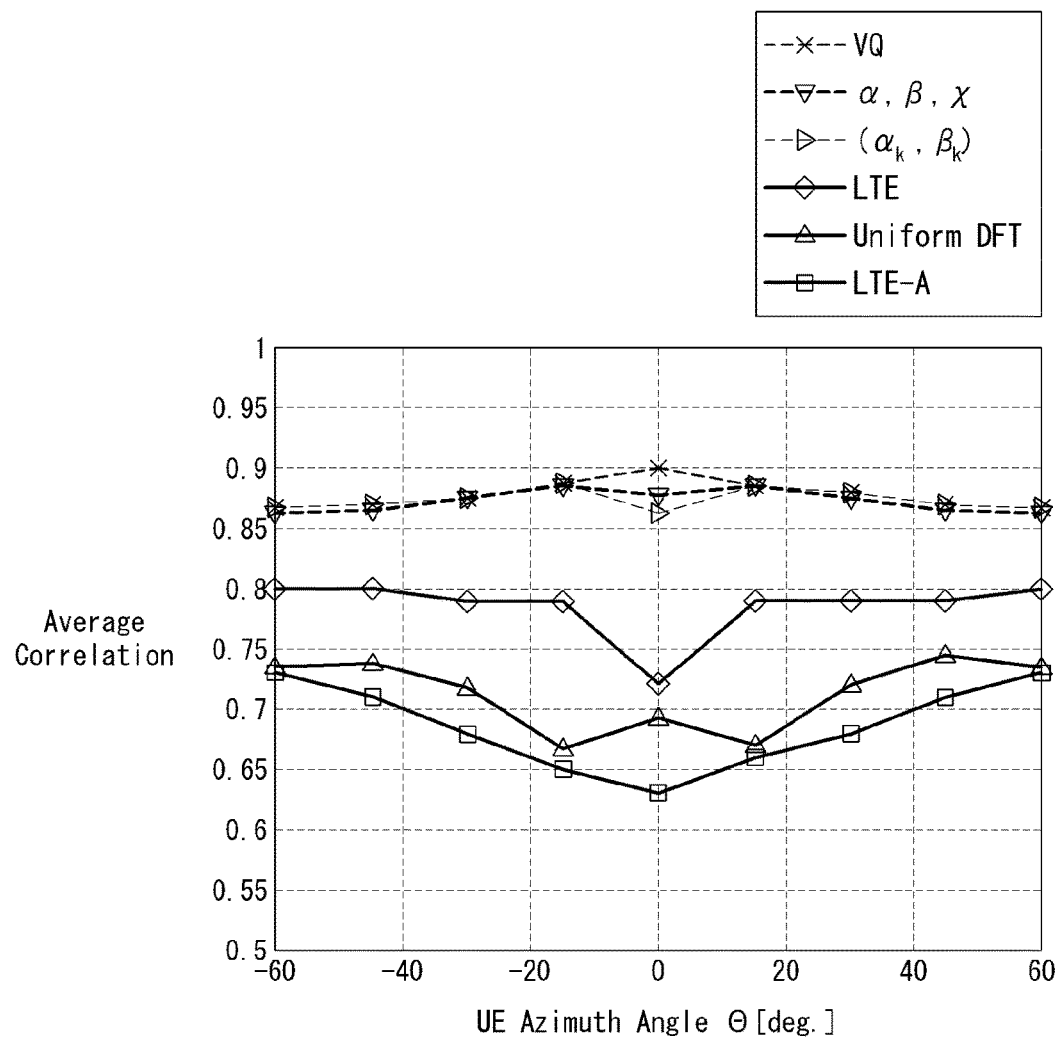
FIG. 15 is a graph illustrating performance evaluation results of a proposal codebook according to a UE azimuth angle in terms of average correlation.

FIG. 15 is a graph illustrating performance evaluation results of a proposal codebook according to a UE azimuth angle in terms of average correlation.

A Vector Quantization (VQ)-based codebook, an LTE 4-Tx codebook, an LTE-Advanced 8-Tx codebook, and a uniform DFT-based codebook are selected as performance comparison targets of the codebook proposed in this specification. Here, VQ is a result using the Lloyd-Max algorithm, and the uniform DFT codebook is a codebook using a DFT matrix having a uniform phase difference value. The average correlation is calculated and compared as the performance evaluation index, and the correlation between the code vector $w_i$ and the channel row vector $\bar{h}$ normalized to 1 in size is $\bar{h}w_i$. The average correlation $\mu$ is a value obtained by averaging, with respect to a plurality of randomly generated channels, the correlation with respect to the corresponding channel when the code vector having the highest correlation among the code vectors in the codebook is selected.

$$\mu = \Sigma[\max_i |\bar{h}w_i|] \hspace{2cm} \text{[Equation 24]}$$

For performance comparison, it is assumed that the average of the channel power is normalized to the same value.

FIG. 15 shows the average correlation according to the UE azimuth angle, and Table 5 shows the results obtained by averaging the results of FIG. 15 for each codebook design method.

TABLE 5

|  | VQ | α, β, χ | $α_k, β_k$ | LTE | Uniform DFT | LTE-A |
|---|---|---|---|---|---|---|
| Average Correlation | 0.8781 | 0.8739 | 0.8725 | 0.7856 | 0.7133 | 0.6867 |

In the graph of FIG. 15, α, β, χ represents the performance of the codebook designed in the codebook design embodiment 1, and ($α_n, β_n$) represents the performance of the codebook designed in the codebook design embodiment 2.

Referring to FIG. 15, the performance evaluation result shows that the proposed codebook exhibits a much higher average correlation than the existing uniform DFT, LTE 4-Tx, and LTE-Advanced 8-Tx, and shows similar performance compared with the VQ-based codebook. Particularly, VQ shows optimal performance while being very high in implementation complexity, but the proposed codebook shows performance close to the optimum value in terms of performance even though its complexity is lower than that of VQ.

Hereinafter, the characteristics of the parameterized codebook proposed in this specification and the difference from the existing codebook will be described.

In the LTE 4-Tx codebook among the existing codebooks, overall performance is good for various channel environments. However, when the correlation between the adjacent antennas increases according to the change of the antenna structure, the performances of the LTE-Advanced 8-Tx codebook and the DFT-based codebook are much better. The LTE-Advanced 8-Tx codebook is a scheme for selecting four consecutive code vectors in the DFT matrix D of 4×32. The n-row and m-column element of the matrix D may be defined as Equation (25) below:

$$d_{n,m} = \frac{1}{2}\exp\left(j\frac{2\pi mn}{32}\right),$$ [Equation 25]

$$n = 0, 1, 2, 3, m = 0, 1, \ldots, 31$$

In this case, the matrix D may be defined as Equation (26).

$$D = \frac{1}{2}\begin{bmatrix} 1 & 1 & 1 & \ldots & 1 \\ 1 & e^{j2\pi/32} & e^{j4\pi/32} & \ldots & e^{j62\pi/32} \\ 1 & e^{j4\pi/32} & e^{j8\pi/32} & \ldots & e^{j124\pi/32} \\ 1 & e^{j6\pi/32} & e^{j12\pi/32} & \ldots & e^{j186\pi/32} \end{bmatrix}$$ [Equation 26]

When the m-th column vector of the matrix D is defined as $d_m$ and thus $D=[d_0\ d_1\ \ldots\ d_{31}]$ is expressed, the k-th codebook from the DFT matrix D may be selected as shown in Equation (27). Also, a total of 16 codebooks may be generated according to k=0, 1, . . . , 15 values.

$$W^{(k)}=[d_{2k\ mod\ 32}\ d_{(2k+1)mod\ 32}\ d_{(2k+2)mod\ 32}\ d_{(2k+3)mod\ 32}]$$ [Equation 27]

In the codebook thus generated, the minimum phase difference between code vector elements is fixed to π/16 radians, and the number of codebooks is also fixed to 16. On the other hand, the embodiments proposed in this specification may flexibly generate and use codebooks having improved accuracy according to azimuth angle information of a UE according to parameter changes.

In the case of the codebook design embodiment 1, the parameter α reflects the phase value characteristics of the first code vector, β determines the phase difference between the adjacent code vectors, and χ serves to compensate for the phase difference generated according to the circular nonlinear antenna arrangement. Thus, through determination of the values of α, β, χ according to the location information, the codebook design example 1 shows better performance than the existing codebooks. Also, in the case of the codebook design embodiment 2, the phase difference according to the channel change is appropriately compensated/reflected using $α_n$ and $β_n$ different by the number of antennas.

Therefore, according to the embodiments of the present invention, it is possible to control various types of codebook sizes, characteristics of code vector phase differences, density between code vectors, etc. suitable for a channel environment through selection of appropriate parameters. If a specific parameter value is substituted into the codebook newly proposed in this specification, the codebook becomes the same as the LTE-Advanced 8-Tx codebook. Accordingly, the codebooks proposed according to the embodiments herein may be considered as a generalized form of the existing LTE-A codebook.

Hereinafter, an operation method and an application method of the present invention will be described.

Figure 16:
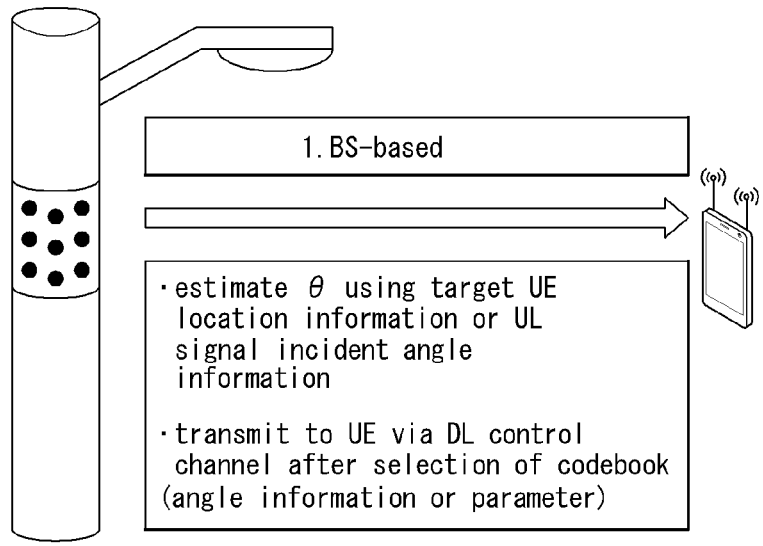
FIG. 16 is a diagram illustrating a signal transmission/reception method using a base station-based or UE-based codebook according to an embodiment of the present invention.
Figure 16:
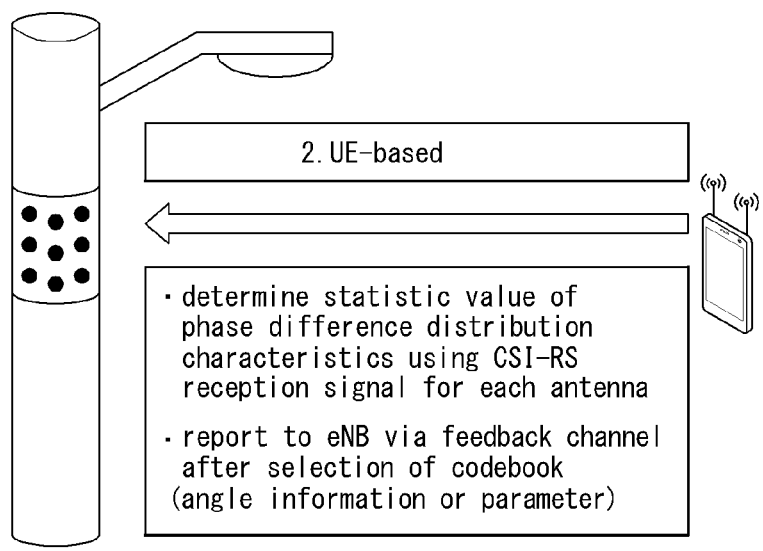

FIG. 16 is a diagram illustrating a signal transmission/reception method using a base station-based or UE-based codebook according to an embodiment of the present invention.

Referring to FIG. 16, a signal transmission/reception method using a codebook according to an exemplary embodiment of the present invention includes a downward feedback in which a base station becomes a base, and upward feedback in which a UE becomes a base.

In the case of downward feedback, the base station may use incident angle information of a UE to set parameters α, β, χ suitable for each UE, and may transmit the set parameters to a UE through a separate control channel. A UE having received the parameter from the base station may generate the codebook according to the above-described embodiment based on the received parameter.

In the case of upward feedback, a UE may first grasp the statistical characteristics of the channel through CSI-RS for each antenna element sent from the base station. The UE selects parameters suitable for wireless communication through CSI-RS and transmits the parameters to the base station through upward feedback. The base station may generate a codebook using at least one parameter reported from the UE. Alternatively, the UE may select a parameter suitable for wireless communication through CSI-RS, and may recommend the parameter to the base station through upward feedback. The base station may select at least one of the parameters recommended from the UE to generate a codebook, and may feedback information about the selected parameter to the UE.

The codebook generated through this downward/upward feedback is utilized as a long-term codebook, and a short-term code vector index is additionally determined according to an instantaneous channel change, such that beamforming based on a long-term codebook and a short-term code vector index can be performed.

Thus, in this specification, a new codebook that may be suitably applied to a non-linear antenna array has been proposed. In the mobile communication system, codebooks are also studied in accordance with the number of antennas, the structure, and the channel environment. The existing codebook is specialized for a uniform linear antenna array. Due to the characteristics of the small cell, and does not reflect a situation where the antenna array shape changes according to the structure installed with the antennas. Accordingly, the present disclosure proposes a new codebook for a non-linear antenna array/environment (e.g., cylindrical antenna array/environment) which is a useful in small cell transmission situations. The newly proposed codebook shows similar performance to VQ which shows the second-best performance in the non-linear antenna array, and the complexity is relatively low. Accordingly, such a proposal codebook may be flexibly applied to various channel environments in a non-linear antenna array situation (e.g., a cylindrical antenna array situation), thereby enabling highly reliable beamforming.

Figure 17:
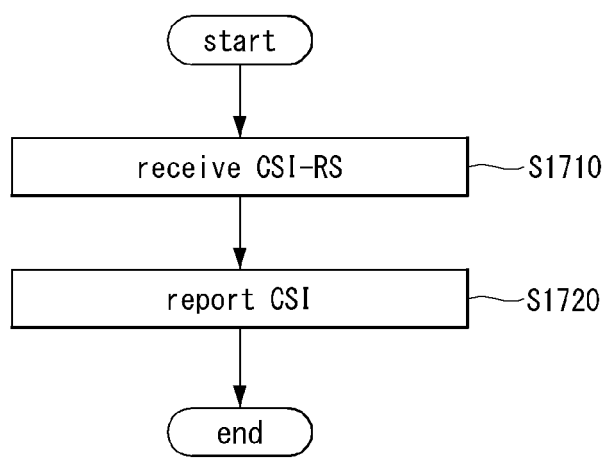
FIG. 17 is a flowchart illustrating a codebook-based signal transmission/reception method of a UE according to an embodiment of the present invention.

FIG. 17 is a flowchart illustrating a codebook-based signal transmission/reception method of a UE according to an embodiment of the present invention. The descriptions and the embodiments described above may be applied in the same or similar manner in regard to the present flowchart, and redundant description will be omitted.

First, a UE may receive CSI-RS from a base station through a multi-antenna port (S1710).

Next, the UE may report channel state information to the base station (S1720). In this case, the channel state information includes a PMI for indicating a specific code vector among a plurality of code vectors included in a codebook. Here, the codebook may correspond to a codebook in which phase differences between adjacent elements included in each code vector are set differently from each other.

In this case, the phase difference between the adjacent elements may be variously set according to embodiments.

In one embodiment, the phase difference may be set different from each other based on a phase parameter related to a phase of each code vector, a phase difference parameter related to a phase difference between adjacent code vectors, and/or a phase difference compensation parameter according to an antenna layout. Here, the phase parameter corresponds to α, the phase difference parameter corresponds to β, and the phase difference compensation parameter corresponds to χ in the codebook design embodiment 1. The phase parameter and the phase difference parameter may be determined to be fixed values based on the azimuth angle of the UE with respect to the base station, and the phase difference compensation parameter may be determined based on the azimuth angle of the UE and dynamically determined according to the element order included in each code vector.

The phase difference may increase when the phase difference parameter value increases by an integer multiple as the order of element increases. Furthermore, information on the phase parameters, the phase difference parameter, and the phase difference compensation parameter may be received from the base station via the control channel. Alternatively, the UE may determine an appropriate phase parameter, phase difference parameter, and phase difference compensation parameter based on CSI-RS received from the base station, and may transmit information on the determined parameter to the base station.

In another embodiment, when the phase parameters related to the phase of the code vector are independently determined for each element in the code vector, the phase difference may be set different from each other based on the phase parameter. Also, when the phase difference parameter related to the phase difference between adjacent code vectors is independently determined for each element in the code vector, the phase difference may be set different from each other based on the phase parameter and the phase difference parameter. In this case, information on the phase parameter and/or the phase difference parameter may be received from the base station via the control channel. Alternatively, the UE may determine an appropriate phase parameter, phase difference parameter, and phase difference compensation parameter based on CSI-RS received from the base station, and may transmit information on the determined parameter to the base station.

If a plurality of codebooks are defined, the UE may receive information on one codebook to be applied among a plurality of codebooks from the base station.

Apparatus to which the Present Invention May be Applied

Figure 18:
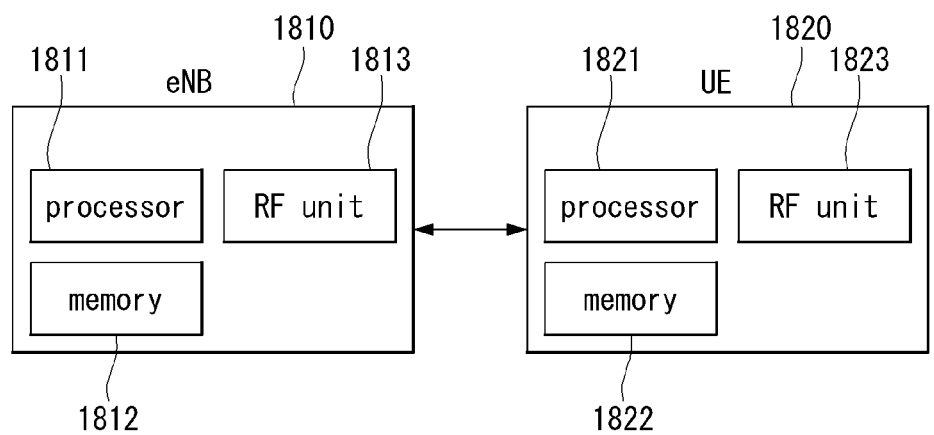
FIG. 18 illustrates a block diagram of a wireless communication apparatus according to an embodiment of the present invention.

FIG. 18 illustrates a block diagram of a wireless communication apparatus according to an embodiment of the present invention.

Referring to FIG. 18, a wireless communication system includes a base station 1810 and a plurality of UEs 1820 located within the region of the base station 1810.

The base station 1810 includes a processor 1811, a memory 1812, and a Radio Frequency (RF) unit 1813. The processor 1811 implements the functions, processes, and/or methods proposed in FIGS. 1 to 17. The layers of the wireless interface protocol may be implemented by the processor 1811. The memory 1812 is connected to the processor 1811, and stores various kinds of information for driving the processor 1811. The RF unit 1813 is connected to the processor 1811 to transmit and/or receive a radio signal.

A UE 1820 includes a processor 1821, a memory 1822, and an RF unit 1823. The processor 1821 implements the functions, processes, and/or methods proposed in FIGS. 1 to 17. The layers of the wireless interface protocol may be implemented by the processor 1821. The memory 1822 is connected to the processor 1821, and stores various kinds of information for driving the processor 1821. The RF unit 1823 is connected to the processor 1821 to transmit and/or receive a radio signal.

The memories 1812 and 1822 may be internal or external to the processors 1811 and 1821, and may be connected to the processors 1811 and 1821 by various well-known methods. Also, the base station 1810 and/or the UE 1820 may have a single antenna or multiple antennas.

The embodiments described above are those in which the components and features of the present invention are combined in a predetermined form. Each component or feature should be considered as being optional unless otherwise expressly stated. Each component or feature may be embodied while being not combined with any other component or feature. It is also possible to configure some embodiments of the present invention by combining some of the components and/or features. The order of the operations described in the embodiments of the present invention may be changed. Some configurations or features of any embodiment may be included in other embodiments, or may be replaced with corresponding configurations or features of other embodiments. It will be obvious that the claims which do not have an explicit citation in the claims can be combined to form an embodiment or a new claim can be included by amendment after the application.

Embodiments according to the present invention may be implemented by various means, for example, hardware, firmware, software, or a combination thereof. In the case of implementation by hardware, an embodiment of the present invention may include one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, a microprocessors, and the like.

In the case of an implementation by firmware or software, an embodiment of the present invention may be implemented in the form of a module, a procedure, a function, or the like for performing the functions or operations described above. The software code may be stored in a memory and driven by a processor. The memory is located inside or outside the processor, and may exchange data with the processor by various well-known means.

It will be apparent to those skilled in the art that the present invention can be embodied in other specific forms without departing from the essential characteristics of the present invention. Accordingly, the foregoing detailed description should not be interpreted as restrictive in all aspects, and should be considered as illustrative. The scope of the present invention should be determined by rational interpretation of the appended claims, and all changes within the equivalent scope of the present invention are included in the scope of the present invention.

Various embodiments for carrying out the invention have been described in the best mode for carrying out the invention.

Although the present invention has been described with reference to examples applied to the 3GPP LTE/LTE-A system, it can be applied to various wireless communication systems other than the 3GPP LTE/LTE-A system.

The invention claimed is:

1. A method for transmitting/receiving, by a UE, a signal based on a codebook in a multi-antenna wireless communication system, the method comprising:
receiving a Channel State Information Reference Signal (CSI-RS) from a base station through a multi-antenna port; and
reporting channel state information to the base station, wherein the channel state information comprises a Precoding Matrix Indicator (PMI) for indicating a specific code vector among a plurality of code vectors comprised in a codebook, and
wherein the codebook is a codebook in which phase differences between adjacent elements comprised in each code vector are set to be different from each other.

2. The method of claim 1, wherein the phase difference is set to be different from each other based on a phase parameter related to a phase of each code vector, a phase difference parameter related to a phase difference between adjacent code vectors and/or a phase difference compensation parameter according to an antenna layout.

3. The method of claim 2,
wherein the phase parameter and the phase difference parameter are determined to be fixed values based on an azimuth angle of the UE with respect to the base station, and
wherein the phase difference compensation parameter is determined based on the azimuth angle of the UE, and is dynamically determined according to an element order comprised in each code vector.

4. The method of claim 2, wherein the phase difference increases as the phase difference parameter value increases by an integer multiple as the order of element increases.

5. The method of claim 2, wherein information on the phase parameter, the phase difference parameter, and the phase difference compensation parameter are received from the base station through a control channel.

6. The method of claim 2, further comprising:
determining the phase parameter, the phase difference parameter and the phase difference compensation parameter based on the CSI-RS; and
transmitting the determined phase parameter, phase difference parameter and phase difference compensation parameter to the base station.

7. The method of claim 3, wherein the codebook is defined by Equation (1):

$$\frac{1}{\sqrt{N}}\begin{bmatrix} 1 & 1 & \cdots & 1 \\ e^{j\alpha} & e^{j(\alpha+\beta)} & \cdots & e^{j(\alpha+(M-1)\beta)} \\ e^{j(2\alpha+\chi)} & e^{j(2(\alpha+\beta)+\chi)} & \cdots & e^{j(2(\alpha+(M-1)\beta)+\chi)} \\ \vdots & \vdots & \ddots & \vdots \\ e^{j((N-1)\alpha+F_{N-1}\chi)} & e^{j((N-1)(\alpha+\beta)+F_{N-1}\chi)} & \cdots & e^{j((N-1)(\alpha+(M-1)\beta)+F_{N-1}\chi)} \end{bmatrix} \quad (1)$$

where the N is the number of elements in each code vector, the M is the number of code vectors, the F_n is $F_n = \Sigma_{k=1}^{n-1} k$, the n is the element order in each code vector, the $\alpha$ is the phase parameter, the $\beta$ is the phase difference parameter, and the $\chi$ is the phase difference compensation parameter.

8. The method according to claim 1, wherein when the phase parameter related to the phase of the code vector is independently determined for each element in the code vector, the phase difference is set to be different from each other based on the phase parameter.

9. The method of claim 8, wherein when the phase difference parameter related to the phase difference between adjacent code vectors is independently determined for each element in the code vector, the phase difference is set to be different from each other based on the phase parameter and the phase difference parameter.

10. The method of claim 9, wherein information on the phase parameter and/or the phase difference parameter is received from the base station through a control channel.

11. The method of claim 9, further comprising:
determining the phase parameter and/or the phase difference parameter based on the CSI-RS; and
transmitting the determined phase parameter and/or phase difference parameter to the base station.

12. The method of claim 9, wherein the codebook is defined by Equation (2):

$$W = \frac{1}{\sqrt{N}}\begin{bmatrix} 1 & 1 & \cdots & 1 \\ e^{j\alpha_1} & e^{j(\alpha_1+\beta_1)} & \cdots & e^{j(\alpha_1+(M-1)\beta_1)} \\ e^{j(\alpha_1+\alpha_2)} & e^{j(\alpha_1+\alpha_2+\beta_1+\beta_2)} & \cdots & e^{j(\alpha_1+\alpha_2+(M-1)(\beta_1+\beta_2))} \\ \vdots & \vdots & \ddots & \vdots \\ e^{j\Sigma_{k=1}^{N-1}\alpha_k} & e^{j\Sigma_{k=1}^{N-1}(\alpha_k+\beta_k)} & \cdots & e^{j\Sigma_{k=1}^{N-1}(\alpha_k+(M-1)\beta_k)} \end{bmatrix} \quad (2)$$

where the N is the number of elements in each code vector, the M is the number of code vectors, the n is the element order in each code vector, the $\alpha\_n$ is the phase parameter, and $\beta\_n$ is the phase difference parameter.

13. The method of claim 1, further comprising receiving, from the base station, information on one codebook to be applied among a plurality of codebooks when the plurality of codebooks are defined.

14. A User Equipment (UE) for transmitting Channel State Information (CSI) in a wireless communication system, the UE comprising:
- an Radio Frequency (RF) unit for transmitting/receiving a radio signal; and
- a processor for controlling the RF unit,
- wherein the processor:
- receives a Channel State Information Reference Signal (CSI-RS) from a base station through a multi-antenna port; and
- reports channel state information to the base station,
- wherein the channel state information comprises a Precoding Matrix Indicator (PMI) for indicating a specific code vector among a plurality of code vectors comprised in a codebook, and
- wherein the codebook is a codebook in which phase differences between adjacent elements comprised in each code vector are set to be different from each other.

* * * * *